(12) United States Patent
Evans et al.

(10) Patent No.: US 7,899,019 B1
(45) Date of Patent: Mar. 1, 2011

(54) METHOD AND SYSTEM FOR BANDWIDTH MANAGEMENT

(75) Inventors: Gregory M. Evans, Raleigh, NC (US); Richard J. Walsh, Raleigh, NC (US)

(73) Assignee: Oto Technologies, LLC, Raleigh, NC (US)

( * ) Notice: Subject to any disclaimer, the term of this patent is extended or adjusted under 35 U.S.C. 154(b) by 0 days.

(21) Appl. No.: 12/817,965

(22) Filed: Jun. 17, 2010

(51) Int. Cl.
*H04W 4/00* (2009.01)

(52) U.S. Cl. ...................... 370/338; 455/422.1

(58) Field of Classification Search .......... 370/329–334, 370/338, 341, 342–345; 455/421–426.2, 455/432.1–435.2, 436–440, 443–444
See application file for complete search history.

(56) References Cited

U.S. PATENT DOCUMENTS

| | | | |
|---|---|---|---|
| 6,785,536 B1 * | 8/2004 | Lee et al. ................. | 455/408 |
| 6,829,643 B1 | 12/2004 | Tobe et al. | |
| 6,993,319 B2 | 1/2006 | Himmel et al. | |
| 7,024,195 B2 | 4/2006 | Miriyala et al. | |
| 7,200,401 B1 | 4/2007 | Hulkkonen et al. | |
| 7,359,341 B2 * | 4/2008 | Okamoto et al. ......... | 370/310 |
| 7,428,413 B2 | 9/2008 | Fink | |
| 7,430,209 B2 | 9/2008 | Porter | |
| 7,463,604 B2 | 12/2008 | Zellner et al. | |
| 7,555,289 B2 | 6/2009 | Kim | |
| 7,593,712 B2 | 9/2009 | Moton, Jr. et al. | |
| 2001/0033600 A1 * | 10/2001 | Yang et al. ............... | 375/130 |
| 2004/0015602 A1 | 1/2004 | Goldhammer et al. | |
| 2004/0203851 A1 | 10/2004 | Vetro et al. | |
| 2004/0224703 A1 | 11/2004 | Takaki et al. | |
| 2006/0025148 A1 | 2/2006 | Karaoguz et al. | |
| 2006/0083211 A1 * | 4/2006 | Laroia et al. ............ | 370/343 |
| 2006/0205413 A1 | 9/2006 | Teague | |
| 2007/0002897 A1 | 1/2007 | Goshen et al. | |
| 2007/0133500 A1 * | 6/2007 | Rajkotia et al. .......... | 370/348 |
| 2008/0117836 A1 | 5/2008 | Savoor et al. | |
| 2008/0181150 A1 * | 7/2008 | Won et al. ................ | 370/310 |
| 2008/0273553 A1 | 11/2008 | Wang et al. | |
| 2009/0197577 A1 | 8/2009 | Agre et al. | |

FOREIGN PATENT DOCUMENTS

WO 2009039690 A1 4/2009

* cited by examiner

*Primary Examiner* — Thai D Hoang
(74) *Attorney, Agent, or Firm* — Withrow & Terranova, PLLC

(57) ABSTRACT

A method and system for controlling bandwidth usage. A mobile device receives zone data that identifies a zone within a cell coverage area. The mobile device receives bandwidth data associated with the zone that identifies a first controlled maximum bandwidth rate. The mobile device determines that it is in the zone, and in response thereto, controls bandwidth usage by the mobile device based on the first controlled maximum bandwidth rate.

14 Claims, 7 Drawing Sheets

| CELL TOWER ID 24A | ZONE A BOUNDARY<br>ZONE A TIME SLOT<br>ZONE A MAX BANDWIDTH RATE | ... | CELL TOWER ID 24N | ZONE N BOUNDARY<br>ZONE N TIME SLOT<br>ZONE N MAX BANDWIDTH RATE |

FIG. 4

METHOD AND SYSTEM FOR BANDWIDTH MANAGEMENT

FIELD OF THE DISCLOSURE

Embodiments disclosed herein relate to controlling bandwidth usage of a mobile device, and in particular to controlling bandwidth usage based on zone data associated with a zone.

BACKGROUND

Smart phones that offer users easy access to content providers, such as Internet web sites, video sites, and music sites are decreasing in cost and increasing in popularity. The aggregate data usage of smart phones is much higher than that of traditional cellular phones. It is likely that bandwidth consumption will grow at a faster rate than service providers can update their networks. Heavy utilization of finite bandwidth results in unacceptable network delays and network lag. Certain areas, or zones, may be high-usage zones that, if usage were constricted in such zones, would leave more bandwidth for use by users outside of the zone. For example, it may be that peak usage at a local shopping mall on a Friday night is four times the peak usage during other times. This is sometimes referred to as a "hot spot." The heavy network usage by the users at the shopping mall not only negatively impacts available bandwidth for other users who are within the hot spot, but also those users who are outside of the hot spot, but within the same cellular tower access area as the hot spot. Constricting, or otherwise controlling, data usage by the users at the shopping mall would provide additional bandwidth to users outside of the hot spot. There is a need, therefore, for a mechanism for controlling bandwidth usage within a hot spot, or zone, to ensure sufficient bandwidth remains available outside the zone.

Service providers are increasingly competing on price, and are thus interested in selling additional services to users. There is also a need, therefore, for a mechanism for controlling bandwidth usage within a zone that can be overridden by a user for a fee.

SUMMARY

Embodiments disclosed herein relate to controlling bandwidth usage by a mobile device based on bandwidth rates associated with a zone in which the mobile device is located. The mobile device periodically receives zone data that identifies a zone, and a first controlled maximum bandwidth rate associated with the zone. The mobile device determines that it is in the zone, and controls bandwidth usage in accordance with the first controlled maximum bandwidth rate.

In one embodiment, the mobile device receives time slot data associated with the zone that identifies a timeframe during which the bandwidth usage is to be controlled in the zone. The mobile device determines at a first point in time that the first point in time is within the timeframe. The mobile device controls bandwidth usage based on the first controlled maximum bandwidth rate. The mobile device determines at a second point in time that is subsequent to the first point in time that the second point in time is outside the timeframe, and the mobile device no longer controls the bandwidth usage based on the first controlled maximum bandwidth rate.

In another embodiment, the mobile device receives an alternate bandwidth rate reference that identifies an alternate maximum bandwidth provider location from which an alternate bandwidth rate other than the first controlled maximum bandwidth rate can be authorized. The mobile device sends the alternate maximum bandwidth provider location a message to obtain a second controlled maximum bandwidth rate. The mobile device receives authorization to control bandwidth based on the second controlled maximum bandwidth rate, and the mobile device controls bandwidth usage by the mobile device based on the second controlled maximum bandwidth rate rather than the first controlled maximum bandwidth rate.

In another embodiment, the mobile device receives instructions that identify an SMS text message that may be sent to the alternate maximum bandwidth provider location to obtain the second controlled maximum bandwidth rate. The mobile device sends the SMS text message to the alternate maximum bandwidth provider location and receives authorization to control bandwidth based on the second controlled maximum bandwidth rate.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

FIG. 4 is a block diagram illustrating an exemplary zone data message that may be received by a plurality of mobile devices;

DETAILED DESCRIPTION

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Embodiments disclosed herein relate to controlling bandwidth usage of a mobile device based on bandwidth rates associated with a zone in which the mobile device is located. The mobile device periodically receives zone data that identifies one or more zones, and first controlled maximum bandwidth rates associated with each zone. The mobile device determines that it is located in a zone, and controls bandwidth usage in accordance with the first controlled maximum bandwidth rate corresponding to the zone.

Figure 1:
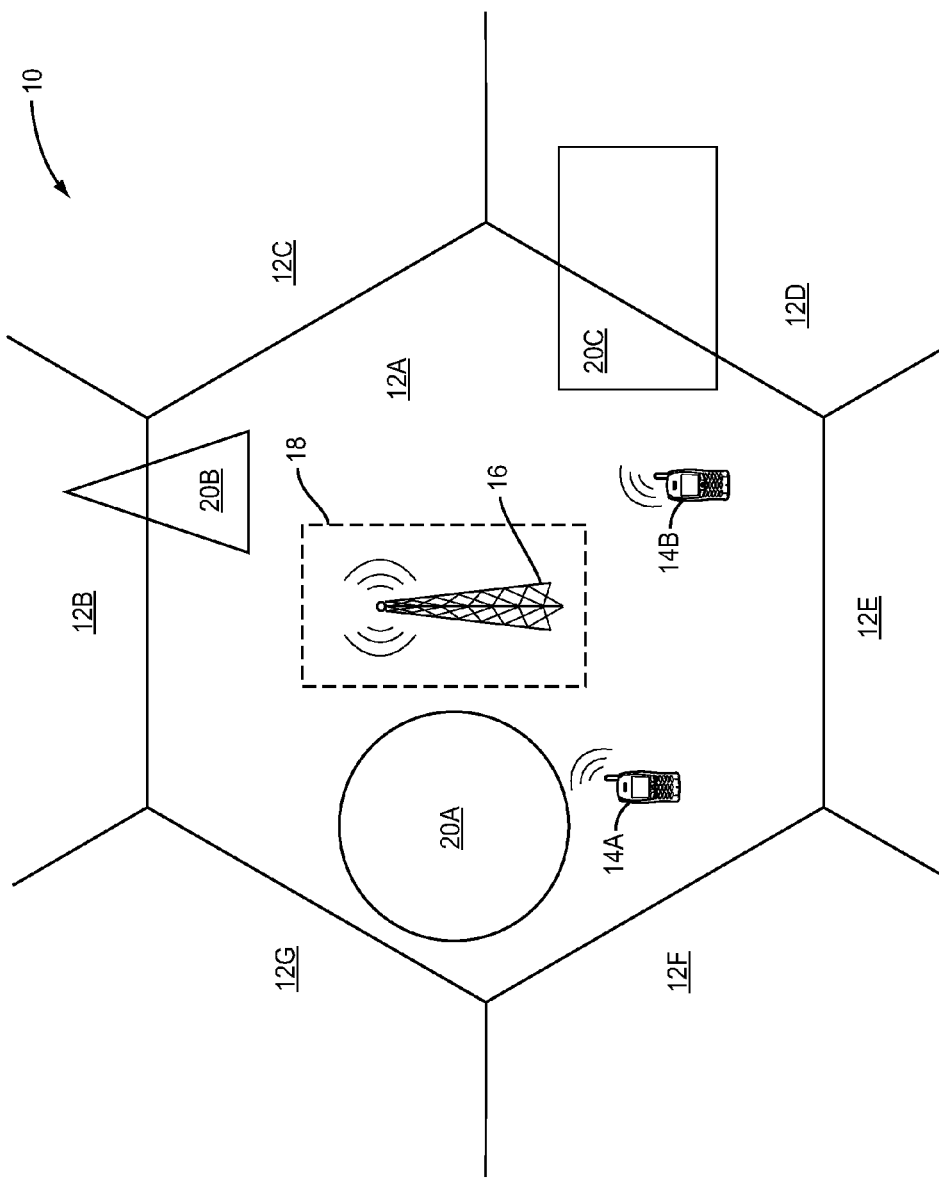
FIG. 1 is a block diagram of a system at a first point in time in which embodiments may be practiced.

FIG. 1 is a block diagram of a system 10 in which embodiments may be practiced. The system 10 includes cell coverage areas 12A-12G (generally, cell coverage area 12 or cell coverage areas 12). Mobile devices 14A, 14B (generally, mobile device 14 or mobile devices 14) are currently located in cell coverage area 12A, but as is commonly understood, mobile devices may move from one cell coverage area 12 to another cell coverage area 12, and equipment associated with the cell coverage areas 12, including for example, a cellular tower 16, will coordinate with each other to hand off the mobile device 14 from one cell coverage area 12 to another. A service provider 18 is typically associated with the cellular tower 16, and provides data, voice, and other services to the mobile device 14 via multiple cellular towers 16.

The system 10 has defined three zones 20A, 20B, and 20C (generally, zone 20 or zones 20). Each zone 20 may be defined by any desired location information, such as longitude and latitude of corner points, a longitude and latitude of a center point and a radius for a circular zone, altitude information identifying a zone 20 at a certain altitude, or the like. The zones 20 may be defined by the service provider 18. The service provider 18 may define the zones 20 for any desired reason, including, for example, to define areas that the service provider 18 knows are high bandwidth usage areas during certain timeframes, or to define an area that encompasses a venue, such as a sporting venue, where the service provider 18 desires to generate additional revenue by selling additional bandwidth, either directly or by selling the rights to resell the bandwidth via the service provider's system to a third party. Because such zones 20 may stay in place for an extended duration of time, they may be referred to as "static" zones. Alternately, a zone 20 may be defined "dynamically" wherein a service provider determines that a particular area within a cell coverage area 12 is a hot spot and is demanding significant bandwidth resources. In such a situation, the service provider may define a zone 20 to cover the affected area and control the bandwidth usage of the subscribers located therein in an ad hoc manner.

Generally, the mobile devices 14 operate at an effective maximum bandwidth rate based on multiple factors, including the presence or absence of obstacles between the mobile device 14 and the cellular tower 16, distance of the mobile device 14 from the cellular tower 16, and the like.

In one embodiment, the service provider 18, via the cellular tower 16, broadcasts zone data which is received by the mobile devices 14 and which identifies the zones 20A-20C. The zone data may identify zones 20 that are located in other cell coverage areas, such as cell coverage areas 12B-12G, even though the mobile devices are currently being served by the cellular tower 16 in the cell coverage area 12A. References to bandwidth usage and bandwidth rates herein refer primarily to data usage and data rates.

The zone data may also include bandwidth data associated with the zones 20 which identifies a first controlled maximum bandwidth rate for use by the mobile devices 14 while in the respective zones 20. For example, a first controlled maximum bandwidth rate for use in the zone 20A may be 64 kbps, and a first controlled maximum bandwidth rate for use in the zone 20B may be 128 kbps. The mobile devices 14 store the zone data in a local storage structure, such as a database, on the mobile devices 14. As the mobile devices 14 move about the system 10, the mobile devices 14 compare the current location of the respective mobile device 14 with the zone data to determine if the respective mobile device 14 is in a zone 20.

In one embodiment, the zone data may also include time slot data that identifies a timeframe during which the bandwidth usage is to be controlled in the corresponding zone 20.

The zone data may be broadcast to the mobile devices 14 in any desired manner. In one embodiment, the zone data is repeatedly multicast on a barker channel that the mobile device 14 tunes to periodically. For example, some network technologies, such as Long Term Evolution (LTE) and WiMAX, offer multicast capabilities via Internet Protocol version 6 (IPv6).

Figure 2:
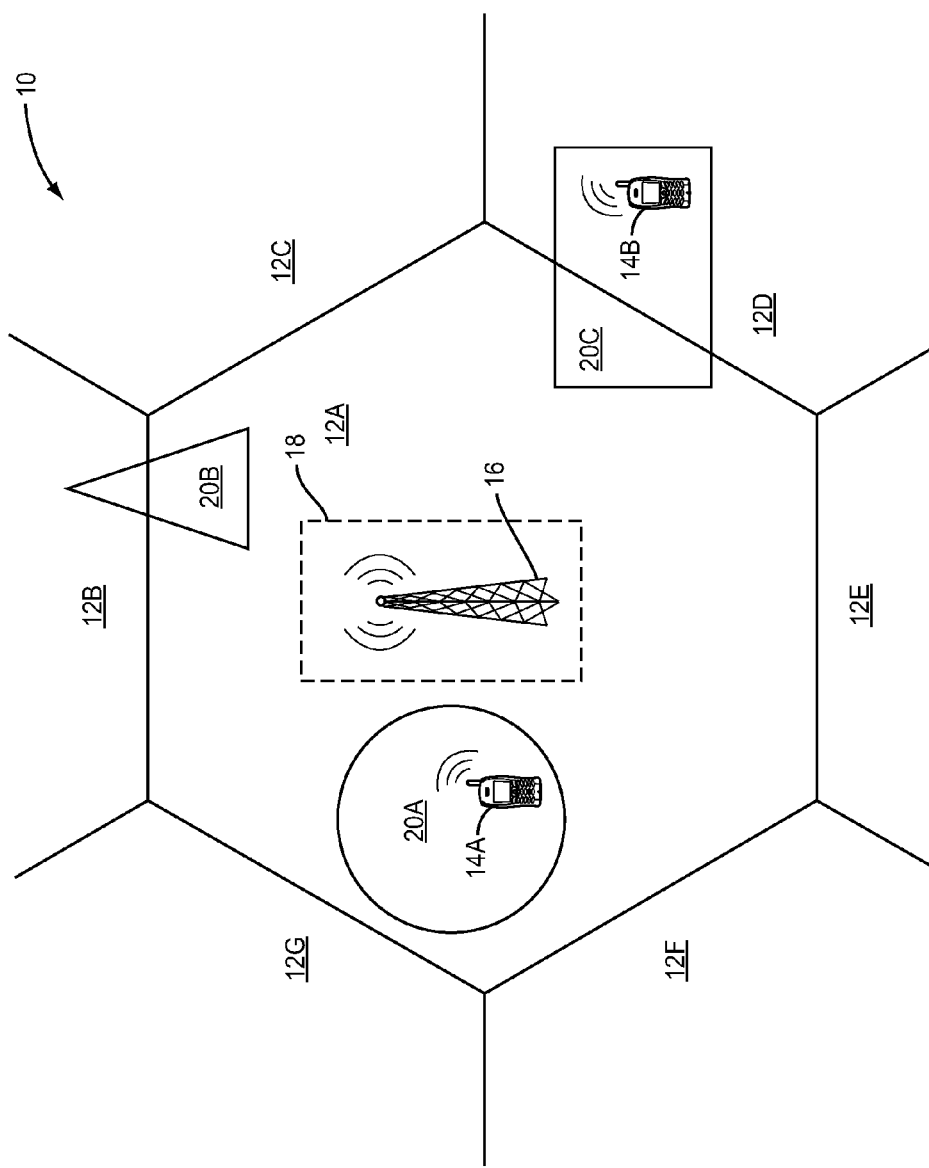
FIG. 2 illustrates the system shown in FIG. 1 at a second point in time.

FIG. 2 illustrates the system 10 shown in FIG. 1 at a second point in time. The mobile device 14A is in the zone 20A, and the mobile device 14B is in the zone 20C. The mobile device 14A controls its bandwidth usage based on the first controlled maximum bandwidth rate associated with the zone 20A, and the mobile device 14B controls its bandwidth usage based on the first controlled maximum bandwidth rate associated with the zone 20C. During transmit operations, the mobile device 14A can control the bandwidth rate by transmitting at or below the specified first controlled maximum bandwidth rate. During receive operations, the mobile device 14A can control the bandwidth rate by rate control or traffic-throttling mechanisms. In one embodiment, the first controlled maximum bandwidth rate associated with the zone 20A is lower than the effective maximum bandwidth rate that the mobile device 14A would otherwise be capable of.

In one embodiment, the mobile devices 14 may receive one or more alternate bandwidth rate references that identify alternate maximum bandwidth provider locations from which the mobile devices 14 can obtain an alternate bandwidth rate other than the first controlled maximum bandwidth rate otherwise associated with a zone 20. The alternate bandwidth rate references may be part of the zone data, or may be broadcast separately. While in a respective zone 20, the mobile devices 14 may be able to obtain an alternate bandwidth rate that exceeds the first controlled maximum bandwidth rate otherwise associated with the zone 20.

Figure 3A:
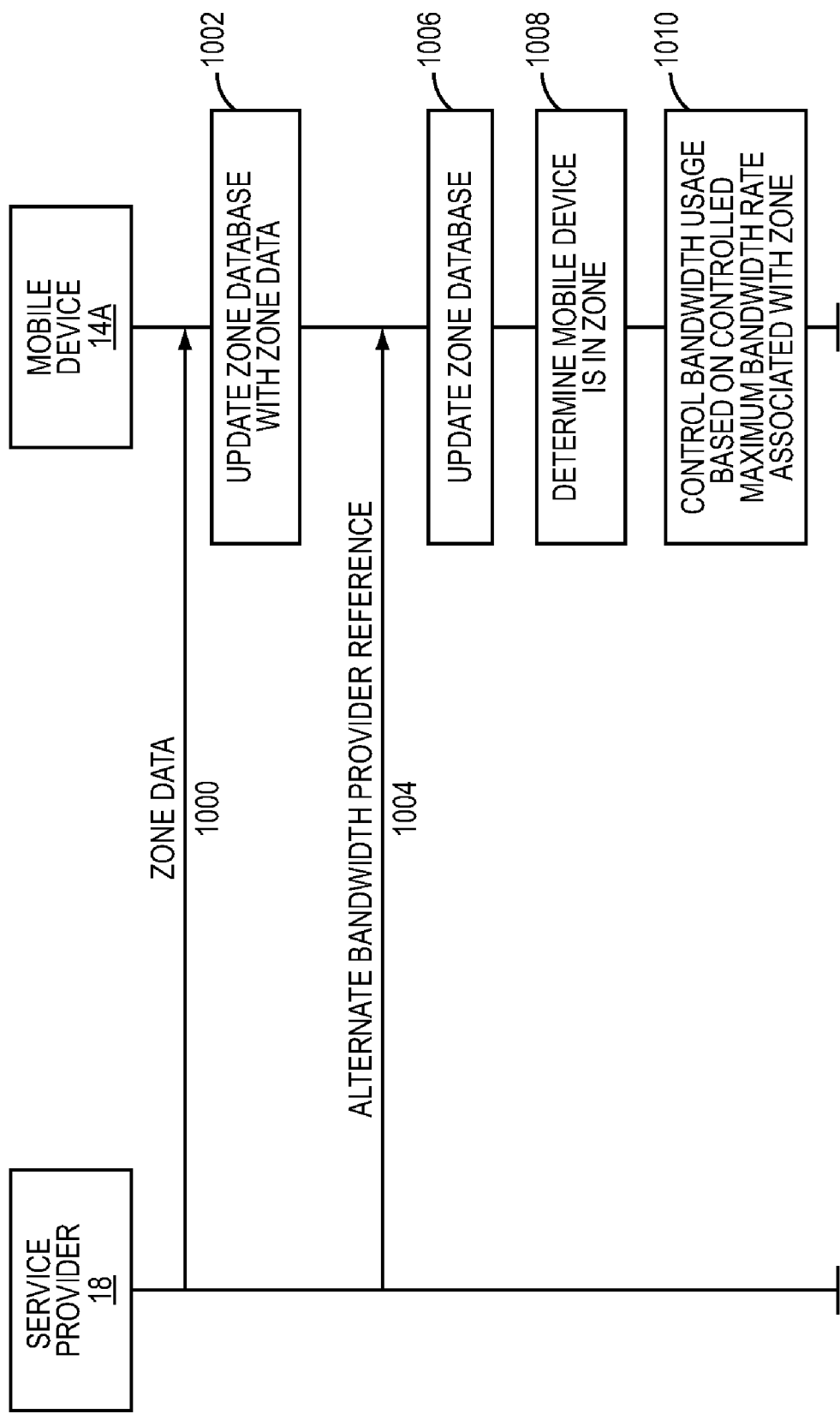
FIGS. 3A and 3B are message flow diagrams illustrating a process for controlling bandwidth usage according to one embodiment.

FIG. 3A is a message flow diagram illustrating a process for controlling bandwidth usage according to one embodiment. FIG. 3A will be discussed in conjunction with FIG. 2. The mobile device 14A receives zone data identifying the zones 20A-20C and first controlled maximum bandwidth rates associated with such zones 20A-20C from the service provider 18 via the cellular tower 16 (step 1000). The mobile device 14A may verify the zone data against zone data already stored in a local database, and if the zone data is different, may store the zone data in the database (step 1002). The mobile device 14A may also receive an alternate bandwidth rate reference that identifies an alternate maximum bandwidth provider location for one or more of the zones 20 from which the mobile device 14 may obtain an alternate bandwidth rate that differs from the first controlled maximum bandwidth rate associated with a respective zone 20 (step 1004). Again, the mobile device 14A may verify the data against data already stored in the local database, and if the data is different, may store the data in the database (step 1006). In one embodiment, the zone data is received by the mobile device 14A via a first multicast broadcast, and the alternate bandwidth rate reference is received by the mobile device 14A via a second multicast broadcast. Periodically, the mobile device 14A may remove data from the database as the time slot data expires.

The mobile device 14A continually determines its current location, and whether the current location is in a zone 20. To determine its current location, the mobile device 14A may use global positioning system (GPS) circuitry and software, triangulation techniques using signals received from multiple cellular towers 16, or the like. Assume that the mobile device 14A determines that its current location is in the zone 20A (step 1008). The mobile device 14A obtains the zone data associated with the zone 20A, and begins controlling the bandwidth usage in accordance with the first controlled maximum bandwidth rate associated with the zone 20A (step 1010). The first controlled maximum bandwidth rate associated with the zone 20A may be zero; in other words, upon entry into the zone 20A the mobile device 14A may completely inhibit all data transmission and receipt.

In one embodiment, the mobile device 14A informs the user of any restrictions imposed by the first controlled maximum bandwidth rate, via, for example, a pop-up window on a display of the mobile device 14A, or by displaying an icon which indicates that the mobile device 14A is currently operating under a first controlled maximum bandwidth rate associated with a zone 20.

Figure 3B:
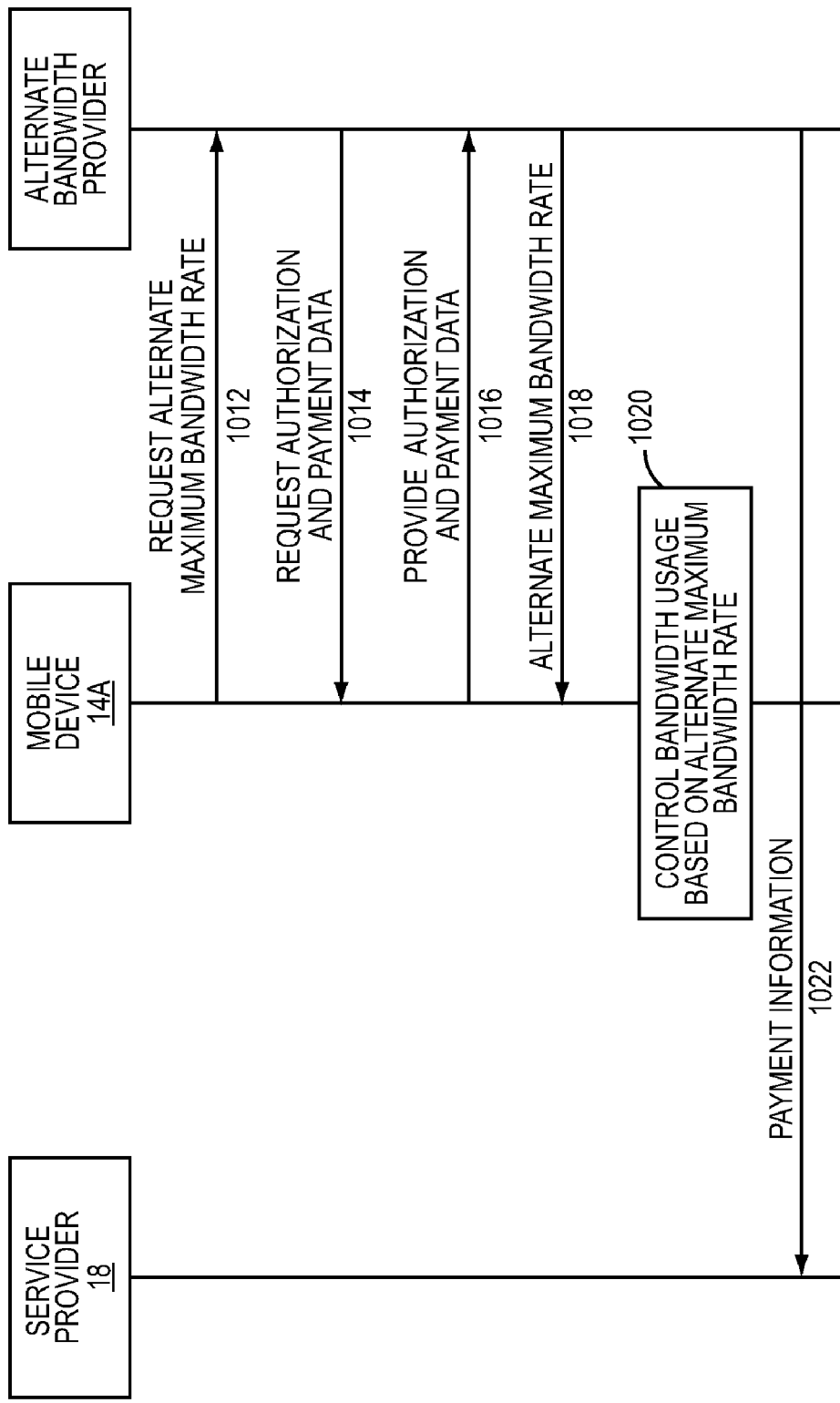

FIG. 3B is a message flow diagram illustrating a process for obtaining an alternate bandwidth rate from an alternate maximum bandwidth provider location according to one embodiment. FIG. 3B will be discussed in conjunction with FIG. 2. The process described in FIG. 3B begins after the last step discussed with respect to FIG. 3A. Assume, for example, that the zone 20A corresponds to a sporting venue, such as a baseball stadium. Assume further that the service provider 18 has set the first controlled maximum bandwidth rate for the zone 20A to zero. Thus, upon entry into the baseball stadium, the user no longer has data access on the mobile device 14A. Assume further that the mobile device 14A has received an alternate bandwidth rate reference identifying an alternate maximum bandwidth provider location from which the user may obtain an alternate bandwidth rate. Upon request by the user, the mobile device 14A displays that an alternate maximum bandwidth provider location is available for the zone 20A. The user selects the alternate maximum bandwidth provider location, and the mobile device 14A sends a message requesting an alternate bandwidth rate to the alternate maximum bandwidth provider location (step 1012). The alternate bandwidth rate reference may comprise a Uniform Resource Identifier (URI), an Internet Protocol address, a telephone number, or any other suitable reference that enables the mobile device 14A to communicate with the alternate maximum bandwidth provider location. The alternate bandwidth rate reference may also include instructions that identify an SMS text message that may be sent to the alternate maximum bandwidth provider location to obtain an alternate maximum bandwidth rate. In such embodiment, the message sent by the mobile device 14A to the alternate maximum bandwidth provider location comprises an SMS text message.

The alternate maximum bandwidth provider location may respond with a request for information, such as an authorization code, payment information, or the like (step 1014). For example, the ticket stub provided to the user may include an authorization number provided by the service provider 18 that, when provided to the alternate maximum bandwidth provider location, verifies that the user is authorized to request an alternate bandwidth rate. The user may also enter payment information, such as a credit card number. Alternately, the payment may be automatically billed to the user's account via the service provider 18, or via conventional third-party billing mechanisms. While an exemplary data exchange has been described herein, embodiments are not limited to any particular exchange of data or sequence of data exchanges, or limited to any particular payment mechanism. For example, payment may be in the form of agreeing to receive advertisements while in the respective zone 20. The mobile device 14A provides the requested information to the alternate maximum bandwidth provider location (step 1016). The alternate maximum bandwidth provider location may comprise, for example, a third party that serves as an agent of the owner of the sporting venue, or may comprise the sporting venue itself, or may comprise the service provider 18.

The alternate maximum bandwidth provider location provides the mobile device 14A with an alternate maximum bandwidth rate that is greater than the first controlled maximum bandwidth rate associated with the zone 20A (step 1018). The alternate maximum bandwidth rate may be referred to herein as a second controlled maximum bandwidth rate. The alternate maximum bandwidth provider location may also send a key or token, digitally sign the message, or the like, such that the mobile device 14A can confirm it is receiving an alternate maximum bandwidth rate from a trusted authority. The mobile device 14A controls the bandwidth usage based on the alternate maximum bandwidth rate. The alternate maximum bandwidth rate is preferably greater than the first controlled maximum bandwidth rate, and may be equal to or less than the effective maximum bandwidth rate of the mobile device 14A (step 1020). The alternate maximum bandwidth provider location may interact with the service provider 18 to inform the service provider 18 that the user purchased an alternate maximum bandwidth rate (step 1022). The service provider 18 may, pursuant to an agreement with the alternate maximum bandwidth provider location, be entitled to a portion of the fee paid by the user.

In one embodiment, the zone data includes time slot data that identifies a timeframe during which bandwidth usage is to be controlled. During the timeframe identified by the time slot the mobile device 14A controls the bandwidth usage in accordance with the first controlled maximum bandwidth rate associated with the zone, or the alternate maximum bandwidth rate obtained from an alternate maximum bandwidth provider location. The mobile device 14A periodically determines the current time, and whether the current time is within the identified timeframe. If the current time is outside the timeframe, the mobile device 14A no longer controls the bandwidth usage based on the first controlled maximum bandwidth rate associated with the zone, or based on an alternate maximum bandwidth rate provided by the alternate maximum bandwidth provider location.

FIG. 4 is a block diagram illustrating an exemplary zone data message 22 that may be received by the mobile devices 14. As discussed previously, the zone data message 22 may be sent periodically on a communications channel that the mobile devices 14 tune to periodically to obtain the zone data. The zone data message 22 may include zone data for the current cell coverage area 12 in which the mobile device 14 is currently being served (e.g., FIG. 1, cell coverage area 12A), as well as for cell coverage areas 12 that are adjacent to the current cell coverage area 12 (e.g., FIG. 1, cell coverage areas 12B-12G). The zone data for each cell coverage area 12 may identify a particular cell coverage area 12 via a cellular tower identifier 24A-24N that is typically provided to a mobile device 14 during wireless communications with a corresponding cellular tower 16. The zone data may also include data identifying the boundaries of zones 20 located within the cell coverage area 12, time slots identifying timeframes during which the mobile device 14A is to control bandwidth usage in accordance with the zone data, and first controlled maximum bandwidth rates associated with the respective zones 20.

Figure 5:
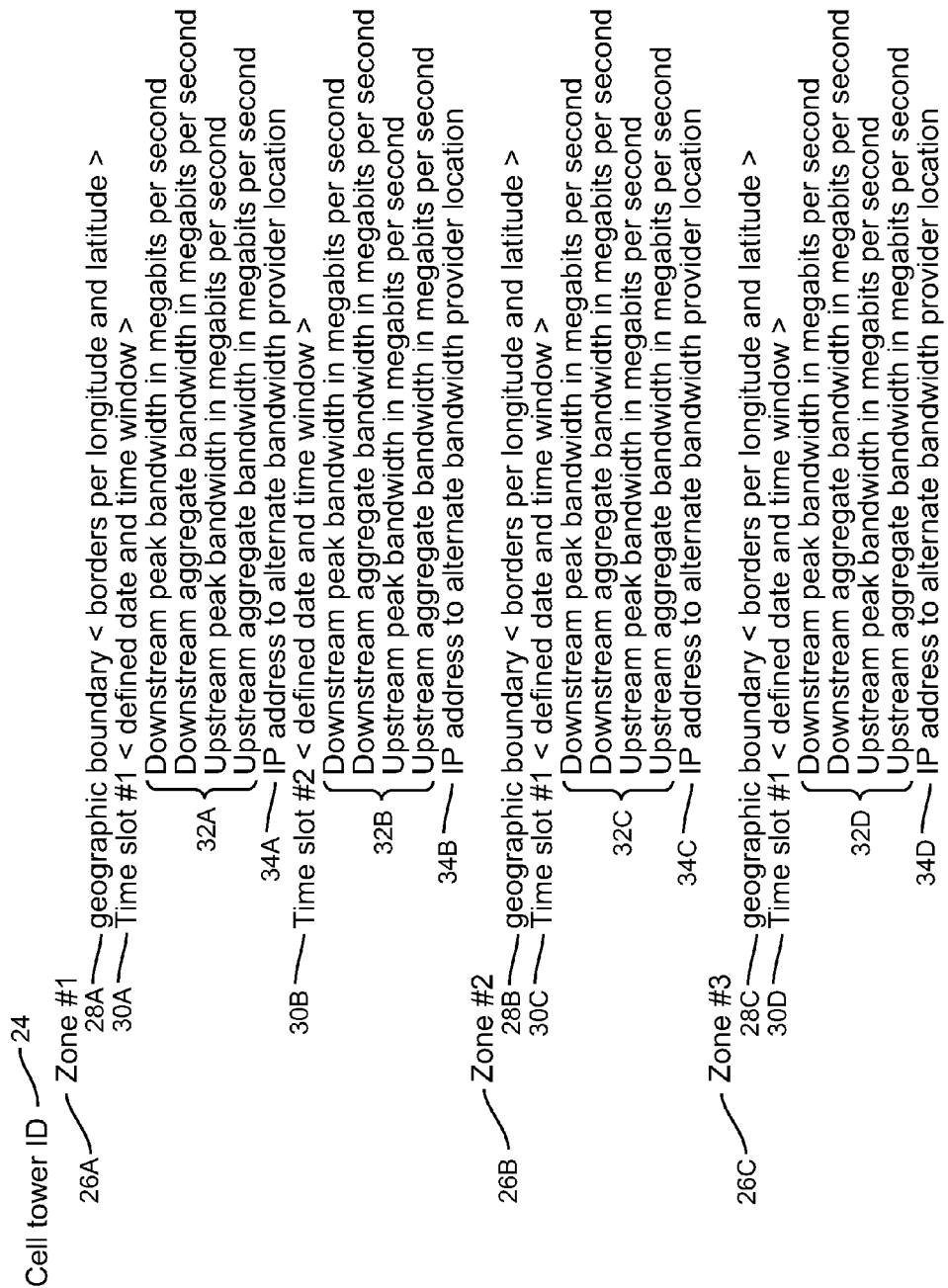
FIG. 5 illustrates exemplary zone data for a particular cell coverage area in greater detail.

FIG. 5 illustrates exemplary zone data for a particular cell coverage area 12 in greater detail. The zone data includes a cellular tower identifier 24 that identifies the cellular tower 16 that provides service in the respective cell coverage area 12. The zone data may be formatted in accordance with a desired Rights Expression Language (REL). The zone data includes one or more zone identifiers 26A-26C (generally, zone identifier 26 or zone identifiers 26), each of which identifies and corresponds to a particular zone 20 in the respective cell coverage area 12. For each zone identifier 26, a zone boundary definition 28 defines the boundary of the corresponding zone 20. For example, the zone boundary definition 28A defines the zone boundary of the zone 20 corresponding to the zone identifier 26A, the zone boundary definition 28B defines the zone boundary of the zone 20 corresponding to the zone identifier 26B, and the zone boundary definition 28C defines the zone boundary of the zone 20 corresponding to the zone identifier 26C.

Time slot data 30 may be used to identify timeframes during which the bandwidth usage is to be controlled for a particular zone 20. Note that multiple time slots may be defined for a respective zone 20, as illustrated by time slot data 30A and time slot data 30B for the zone identifier 26A. The zone data also includes bandwidth data 32A-32D (generally, bandwidth data 32), that identifies one or more first controlled maximum bandwidth rates for the respective zone 20. As depicted in FIG. 5, the bandwidth data 32 may include a downstream peak bandwidth rate, a downstream aggregate bandwidth rate, an upstream peak bandwidth rate, and an upstream aggregate bandwidth rate. However, embodiments are not limited to any particular parameters for defining bandwidth data 32, so long as the bandwidth data 32 enables the mobile device 14 to constrain bandwidth usage in a definable manner.

The zone data may also include one or more alternate bandwidth rate references 34A-34D (generally, alternate bandwidth rate reference 34) for each zone 20. The alternate bandwidth rate reference 34 may differ from time slot to time slot for the same zone 20. The alternate bandwidth rate reference 34 identifies an alternate maximum bandwidth provider location of an alternate bandwidth provider from which an alternate bandwidth rate may be obtained. While depicted in FIG. 5 as an IP address, the alternate bandwidth rate reference 34 may comprise any data that enables the mobile device 14 to communicate with the alternate maximum bandwidth provider location.

While not illustrated in FIG. 5, the maximum bandwidth usage may be applied at the application level rather than applied to all data communications. Thus, the zone data may identify particular applications that, when executed on the mobile device 14, are limited in accordance with a controlled maximum bandwidth rate. For example, the zone data may indicate that only game applications that utilize online visualizations, or only high-definition content applications, be limited by the first controlled maximum bandwidth rate.

Figure 6:
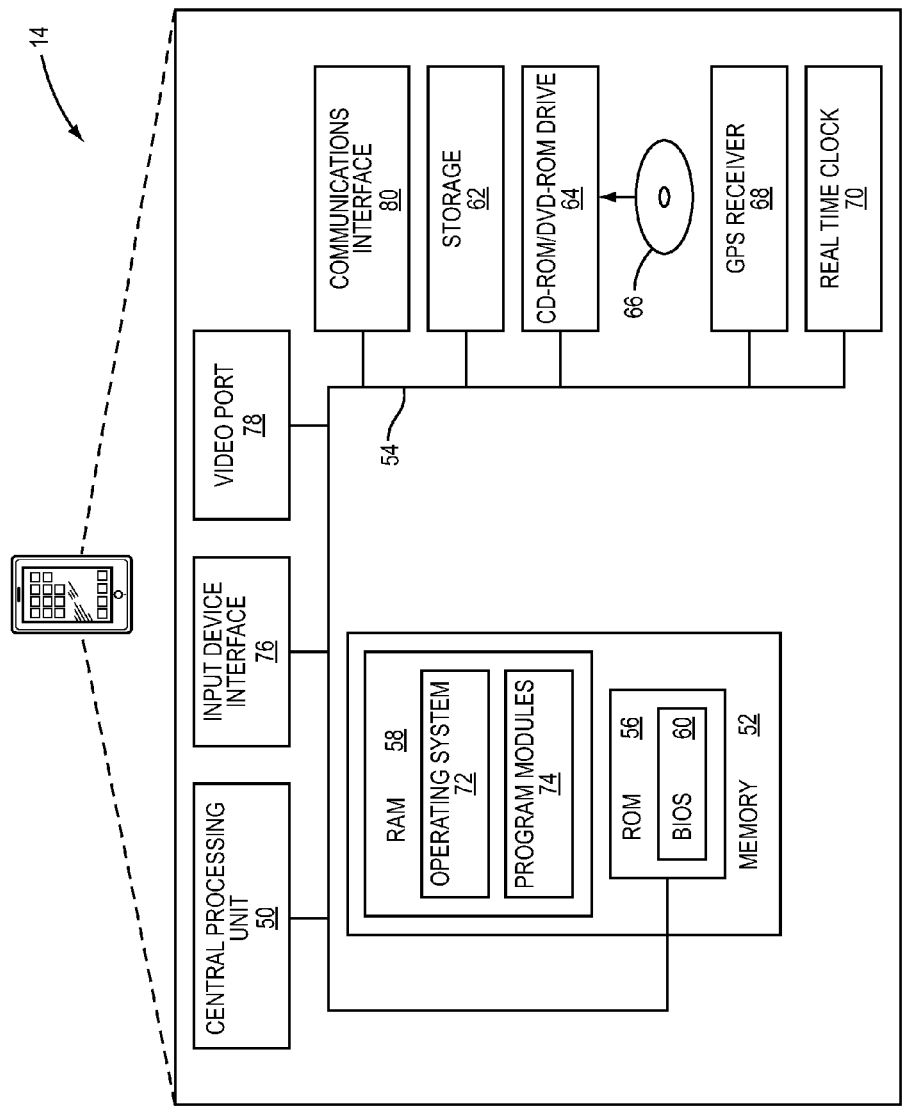
FIG. 6 illustrates an exemplary mobile device according to one embodiment.

FIG. 6 illustrates an exemplary mobile device 14 according to one embodiment. The mobile device 14 may comprise, for example, a laptop computer, a cellular phone or smart phone, a personal digital assistant (PDA), an Apple® iPad™, or the like. In addition to components discussed previously herein, the exemplary mobile device 14 may also include a central processing unit 50, a system memory 52, and a system bus 54. The system bus 54 provides an interface for system components including, but not limited to, the system memory 52 and the central processing unit 50. The central processing unit 50 can be any of various commercially available or proprietary processors. Dual microprocessors and other multi-processor architectures may also be employed as the central processing unit 50.

The system bus 54 can be any of several types of bus structures that may further interconnect to a memory bus (with or without a memory controller), a peripheral bus, and/or a local bus using any of a variety of commercially available bus architectures. The system memory 52 can include non-volatile memory 56 (e.g., read only memory (ROM), erasable programmable read only memory (EPROM), electrically erasable programmable read only memory (EEPROM), etc.) and/or volatile memory 58 (e.g., random access memory (RAM)). A basic input/output system (BIOS) 60 can be stored in the non-volatile memory 56, and can include the basic routines that help to transfer information between elements within the mobile device 14. The volatile memory 58 can also include a high-speed RAM such as static RAM for caching data.

The mobile device 14 may further include a storage 62, which may comprise, for example, an internal hard disk drive (HDD) (e.g., enhanced integrated drive electronics (EIDE) or serial advanced technology attachment (SATA)) for storage, flash memory, or the like. The zone database, for example, may be stored in the storage 62. The mobile device 14 may further include an optical disk drive 64 (e.g., for reading a CD-ROM or DVD-ROM 66). The drives and associated computer-readable and computer-usable media provide non-volatile storage of data, data structures, computer-executable instructions, and so forth. For the mobile device 14, the drives and media accommodate the storage of any data in a suitable digital format. Although the description of computer-readable media above refers to an HDD and optical media such as a CD-ROM or DVD, it should be appreciated by those skilled in the art that other types of media which are readable by a computer, such as Zip disks, magnetic cassettes, flash memory cards, cartridges, and the like, may also be used in the exemplary operating environment, and further, that any such media may contain computer-executable instructions for performing novel methods of the disclosed architecture.

The mobile device 14 may include a global positioning system (GPS) receiver 68 which enables the mobile device 14 to determine, among other things, whether the mobile device 14 is in a zone 20. The GPS receiver 68 may also provide timestamp information that identifies the current time of day which may be used by the mobile device 14 for comparison to time slot data associated with a zone 20. Alternately, a real time clock 70 may be used to determine the current time.

A number of program modules can be stored in the drives and volatile memory 58, including an operating system 72 and one or more program modules 74, which implement the functionality described herein, including, for example, functionality associated with determining whether the mobile device 14 is in a zone 20, functionality for controlling the bandwidth usage of the mobile device 14 based on bandwidth data associated with the zone 20, and other processing and functionality described herein. It is to be appreciated that the embodiments can be implemented with various commercially available operating systems or combinations of operating systems. All or a portion of the embodiments may be implemented as a computer program product, such as a computer-usable or computer-readable medium having a computer-readable program code embodied therein. The computer-readable program code can include software instructions for implementing the functionality of the embodiments described herein. The central processing unit 50, in conjunction with the program modules 74 in the volatile memory 58, may serve as a control system for the mobile device 14 that is configured to, or adapted to, implement the functionality described herein.

A user may be able to enter commands and information into the mobile device 14 through one or more wired or wireless input devices, for example, a keyboard and a pointing device, such as a mouse (not illustrated), or via a display where the display is a touch screen. Other input devices (not illustrated) may include a microphone, an infrared (IR)

remote control, a joystick, a game pad, a stylus pen, or the like. These and other input devices are often connected to the central processing unit 50 through an input device interface 76 that is coupled to the system bus 54 but can be connected by other interfaces such as a parallel port, an IEEE 1394 serial port, a game port, a universal serial bus (USB) port, an IR interface, etc.

The mobile device 14 may drive a separate or integral display device, which may also be connected to the system bus 54 via an interface, such as a video port 78. The mobile device 14 wirelessly communicates via a communications interface 80, which is adapted to communicate wirelessly with the cellular tower 16.

The mobile device 14 may also be operable to communicate with any wireless devices or entities operatively disposed in wireless communication, for example, a printer, a scanner, or a desktop or portable computer, via wireless technologies, such as Wi-Fi® and Bluetooth®, for example.

Those skilled in the art will recognize improvements and modifications to the preferred embodiments of the present disclosure. All such improvements and modifications are considered within the scope of the concepts disclosed herein and the claims that follow.

What is claimed is:

1. A method for controlling bandwidth usage, comprising:
   receiving, by a mobile device, zone data that identifies a zone within a cell coverage area;
   receiving, by the mobile device, bandwidth data associated with the zone that identifies a first controlled maximum bandwidth rate;
   receiving time slot data associated with the zone that identifies a timeframe during which the bandwidth usage is to be controlled;
   determining that the mobile device is in the zone;
   determining at a first point in time that the first point in time is within the timeframe;
   controlling the bandwidth usage by the mobile device based on the first controlled maximum bandwidth rate at the first point in time;
   determining at a second point in time subsequent to the first point in time that the mobile device is in the zone and that the second point in time is outside of the timeframe; and
   in response, no longer controlling the bandwidth usage by the mobile device based on the first controlled maximum bandwidth rate.

2. The method of claim 1, wherein the mobile device operates at an effective maximum bandwidth rate while in the cell coverage area outside of the zone, and wherein the first controlled maximum bandwidth rate is a lower rate than the effective maximum bandwidth rate.

3. A method for controlling bandwidth usage, comprising:
   receiving, by a mobile device, zone data that identifies a zone within a cell coverage area;
   receiving, by the mobile device, bandwidth data associated with the zone that identifies a first controlled maximum bandwidth rate;
   determining that the mobile device is in the zone;
   receiving an alternate bandwidth rate reference identifying an alternate maximum bandwidth provider location from which an alternate bandwidth rate other than the first controlled maximum bandwidth rate can be obtained;
   sending a message to the alternate maximum bandwidth provider location to obtain a second controlled maximum bandwidth rate;
   receiving authorization to control bandwidth usage by the mobile device based on the second controlled maximum bandwidth rate; and
   controlling the bandwidth usage by the mobile device based on the second controlled maximum bandwidth rate.

4. The method of claim 3, further comprising receiving instructions that identify an SMS text message that may be sent to the alternate maximum bandwidth provider location to obtain the second controlled maximum bandwidth rate, and wherein sending the message to the alternate maximum bandwidth provider location comprises sending the SMS text message to the alternate maximum bandwidth provider location.

5. The method of claim 3, further comprising:
   receiving by the mobile device payment data from a user;
   providing the payment data to the alternate maximum bandwidth provider location; and
   based on providing the payment data, receiving the authorization to control the bandwidth usage by the mobile device based on the second controlled maximum bandwidth rate.

6. The method of claim 5, wherein the mobile device operates at an effective maximum bandwidth rate while in the cell coverage area outside of the zone, and wherein the first controlled maximum bandwidth rate is less than the effective maximum bandwidth rate and the second controlled maximum bandwidth rate is greater than the first controlled maximum bandwidth rate and less than the effective maximum bandwidth rate.

7. A mobile device, comprising:
   a communications interface adapted to communicate with a network; and
   a control system coupled to the communications interface, the control system comprising a processor and adapted to:
      receive zone data that identifies a zone within a cell coverage area;
      receive bandwidth data associated with the zone that identifies a first controlled maximum bandwidth rate;
      receive time slot data associated with the zone that identifies a timeframe during which the bandwidth usage is to be controlled;
      determine that the mobile device is in the zone;
      determine at a first point in time that the first point in time is within the timeframe;
      control the bandwidth usage by the mobile device based on the first controlled maximum bandwidth rate at the first point in time;
      determine at a second point in time subsequent to the first point in time that the mobile device is in the zone and that the second point in time is outside of the timeframe; and
      in response, no longer control the bandwidth usage by the mobile device based on the first controlled maximum bandwidth rate.

8. The mobile device of claim 7, wherein the first controlled maximum bandwidth rate comprises a first maximum upstream peak bandwidth rate and a first maximum downstream peak bandwidth rate, and to control the bandwidth usage the control system is further adapted to:
   transmit data at or below the first maximum upstream peak bandwidth rate; and
   control data received by the mobile device at or below the first maximum downstream bandwidth rate.

9. The mobile device of claim 7, wherein the mobile device operates at an effective maximum bandwidth rate while in the cell coverage area outside of the zone, and wherein the first controlled maximum bandwidth rate is less than the effective maximum bandwidth rate.

10. The mobile device of claim 7, wherein the control system is further adapted to receive an alternate bandwidth rate reference identifying an alternate maximum bandwidth provider location from which an alternate bandwidth rate other than the first controlled maximum bandwidth rate can be obtained.

11. The mobile device of claim 10, wherein the control system is further adapted to:
  send a message to the alternate maximum bandwidth provider location to obtain a second controlled maximum bandwidth rate;
  receive authorization to control the bandwidth usage by the mobile device based on the second controlled maximum bandwidth rate; and
  control the bandwidth usage by the mobile device based on the second controlled maximum bandwidth rate.

12. The mobile device of claim 11, wherein the control system is further adapted to:
  receive by the mobile device payment data from a user;
  provide the payment data to the alternate maximum bandwidth provider location; and
  based on providing the payment data, receive the authorization to control the bandwidth usage by the mobile device based on the second controlled maximum bandwidth rate.

13. The mobile device of claim 12, wherein the mobile device operates at an effective maximum bandwidth rate while in the cell coverage area outside of the zone, and wherein the first controlled maximum bandwidth rate is less than the effective maximum bandwidth rate and the second controlled maximum bandwidth rate is greater than the first controlled maximum bandwidth rate and less than the effective maximum bandwidth rate.

14. The mobile device of claim 7, wherein the zone data is received via an IPv6 multicast.

* * * * *